United States Patent
Kim et al.

(10) Patent No.: US 10,106,085 B2
(45) Date of Patent: Oct. 23, 2018

(54) VEHICLE SIDE AND REAR MONITORING SYSTEM WITH FAIL-SAFE FUNCTION AND METHOD THEREOF

(71) Applicants: Hyundai Motor Company, Seoul (KR); Kia Motors Corporation, Seoul (KR); SL Corporation, Daegu (KR)

(72) Inventors: Hyun Sub Kim, Seoul (KR); Keun Sig Lim, Gyeonggi-do (KR); Chan Mook Choi, Icheon (KR); Chang Ju Kim, Daego (KR); Dong Uk Kang, Seoul (KR); Seok Keon Kwon, Gyeonggi-do (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 80 days.

(21) Appl. No.: 15/297,224

(22) Filed: Oct. 19, 2016

(65) Prior Publication Data
US 2017/0166129 A1    Jun. 15, 2017

(30) Foreign Application Priority Data
Dec. 11, 2015    (KR) .......................... 10-2015-0176708

(51) Int. Cl.
*H04N 7/18*    (2006.01)
*B60R 1/00*    (2006.01)
*G06K 9/00*    (2006.01)

(52) U.S. Cl.
CPC ............ *B60R 1/00* (2013.01); *G06K 9/00791* (2013.01); *B60R 2300/105* (2013.01);
(Continued)

(58) Field of Classification Search
CPC ............................... B60R 1/00; G06K 9/00791
(Continued)

(56) References Cited

U.S. PATENT DOCUMENTS

| | | | |
|---|---|---|---|
| 9,725,039 B2 * | 8/2017 | Matsukawa | ............... B60R 1/00 |
| 2002/0003571 A1 * | 1/2002 | Schofield | ............... B60C 23/00 |
| | | | 348/148 |

(Continued)

FOREIGN PATENT DOCUMENTS

| | | | |
|---|---|---|---|
| JP | 2003-087781 A | 3/2003 | |
| JP | 2010-076461 A | 4/2010 | |

(Continued)

*Primary Examiner* — Helen Shibru
(74) *Attorney, Agent, or Firm* — Mintz Levin Cohn Ferris Glovsky and Popeo, P.C.; Peter F. Corless

(57) ABSTRACT

A vehicle side and rear monitoring system with a fail-safe function and a method thereof are provided. The system provides a fail-safe function for safe driving of a vehicle when an abnormality occurs in a side monitoring system of the vehicle, and a technique that provides a continuous side field of view of the vehicle when an abnormality occurs in the side monitoring system in the vehicle equipped with an AVM system. In addition, the system and provides a technique that corrects the distortion of an image captured by an AVM camera and performs an image rotation transformation to provide the image captured by the AVM camera at the same angle as that provided by side-view cameras. Therefore, when an abnormality occurs in the side monitoring system, the vehicle side and rear monitoring system with a fail-safe function continuously provides the same image as captured by the side-view cameras.

16 Claims, 4 Drawing Sheets

(52) U.S. Cl.
CPC ..... *B60R 2300/30* (2013.01); *B60R 2300/607* (2013.01); *B60R 2300/802* (2013.01)

(58) Field of Classification Search
USPC .................. 348/148; 701/41, 43, 53, 65, 76
See application file for complete search history.

(56) References Cited

U.S. PATENT DOCUMENTS

| | | | | |
|---|---|---|---|---|
| 2010/0208074 A1* | 8/2010 | Hattori | ..................... | B60Q 1/50 348/148 |
| 2013/0033604 A1* | 2/2013 | Ohshima | ................. | B60R 11/04 348/148 |
| 2013/0265431 A1* | 10/2013 | Hattori | ..................... | H04N 7/18 348/148 |
| 2013/0302761 A1* | 11/2013 | Best | ..................... | G09B 19/167 434/71 |
| 2014/0063250 A1* | 3/2014 | Park | ................... | H04N 5/23206 348/148 |
| 2014/0114534 A1* | 4/2014 | Zhang | ....................... | B60R 1/00 701/42 |
| 2014/0136054 A1* | 5/2014 | Hsia | .......................... | B60R 1/00 701/42 |
| 2015/0002620 A1* | 1/2015 | Shin | ................... | G06K 9/00805 348/36 |
| 2015/0127217 A1* | 5/2015 | Lee | ....................... | B60W 30/06 701/36 |
| 2016/0165148 A1* | 6/2016 | Itoh | .......................... | B60R 1/00 348/148 |
| 2016/0176344 A1* | 6/2016 | Wang | ................ | H04N 5/23229 348/36 |
| 2016/0332574 A1* | 11/2016 | Park | ....................... | H04N 7/181 |
| 2017/0134661 A1* | 5/2017 | Chietein | ............ | H04N 5/23293 |
| 2017/0297491 A1* | 10/2017 | Tanaka | .................... | B60R 1/002 |
| 2018/0103185 A1* | 4/2018 | Kim | ..................... | H04N 5/225 |

FOREIGN PATENT DOCUMENTS

| | | |
|---|---|---|
| JP | 2010-188902 A | 9/2010 |
| JP | 2015-019271 A | 1/2015 |
| KR | 2013-0057778 A | 6/2013 |
| KR | 10-1470177 B1 | 12/2014 |

* cited by examiner

VEHICLE SIDE AND REAR MONITORING SYSTEM WITH FAIL-SAFE FUNCTION AND METHOD THEREOF

CROSS-REFERENCE TO RELATED APPLICATION

This application claims under 35 U.S.C. § 119(a) the benefit of priority to Korean Patent Application No. 10-2015-0176708 filed on Dec. 11, 2015, the entire contents of which are incorporated herein by reference.

BACKGROUND (a) Technical Field

The present disclosure relates to a vehicle side monitoring system, and more particularly, to a vehicle side monitoring system that continuously and stably provides a side image of a vehicle for a driver even when an abnormality occurs in components for side-monitoring in the vehicle using an imaging device to monitor the side of the vehicle.

(b) Background Art

With the recent advances in image acquisition and display technology, view-securing devices have been developed in an attempt to replace existing side-view mirrors for checking the side and rear information of a vehicle, namely monitoring systems which display side-and-rear image information acquired by a camera on a display unit such that a drive may check the same.

In a vehicle equipped with a side and rear monitoring system, compact side-view cameras for capturing images around the vehicle are mounted on both left and right of the vehicle in place of existing side-view mirrors. In addition, image signals acquired by the side-view cameras are processed and displayed through side-view monitors within the vehicle, and a driver is then able to check the side and rear of the vehicle using image information displayed on a display unit.

When this side and rear monitoring system is applied to the vehicle, it is possible to resolve blind spots (e.g., decrease blind spots) caused by existing side-view mirrors and various other problems relating to the side-view mirrors. In other words, it is possible to prevent the collision or damage of the side-view mirrors protruding to the left and right of the vehicle, to resolve the need for attention to the anti-collision of the side-view mirrors during parking, and to resolve deterioration of the external appearance of the vehicle due to the protruding structure of the side-view mirrors.

Although an electric side-view mirror, which has recently been developed, is foldable when not in use, there are problems in that the electric side-view mirror is maintained in a protruding state and when the electric side-view mirror fails, repairs are costly. In addition, since a monitoring system using cameras (e.g., view-securing device) resolves problems relating to air resistance, noise generation, poor visibility during raining, etc. due to side-view mirrors, it may contribute to enhancing the marketability of the vehicle.

However, components for outputting side and rear monitoring images may malfunction even though the above side and rear monitoring system is used. Therefore, when the side and rear monitoring system does not have a separate fail-safe component, the system is unable to stably provide side and rear information to a driver. In order to resolve the above problem, Korean Patent No. 10-1299120, entitled "Dual-type side and rear monitoring system for installation within vehicle" (hereinafter, referred to as "document 1") discloses a technique for providing a separate side-view mirror part when an abnormality occurs in the side and rear monitoring system.

FIG. 1 illustrates the configuration of the system, and the system includes a mirror part located inside the vehicle, independently of side-view cameras according to the related art. However, since the mirror part as a fail-safe component disclosed in document 1 must be provided as a separate device within the vehicle, the system has space restraints. Accordingly, it may be difficult to provide wide side and rear fields of view which are basically provided by the side and rear monitoring system. Thus, there is a need for technology that provides a continuous image while maintaining a field of view provided by the side-view monitors of the vehicle, when an abnormality occurs in the side and rear monitoring system.

The above information disclosed in this section is merely for enhancement of understanding of the background of the invention and therefore it may contain information that does not form the prior art that is already known in this country to a person of ordinary skill in the art.

SUMMARY

The present invention provides a fail-safe function for safe driving of a vehicle when an abnormality occurs in a side monitoring system of the vehicle. Further, the present invention provides a continuous side field of view of the vehicle when an abnormality occurs in the side monitoring system in the vehicle equipped with an around view monitoring (AVM) system. In another aspect, the present invention provides a technique that corrects the distortion of an image captured by an AVM imaging device and performs an image rotation transformation to provide the image captured by the AVM imaging device at the same angle as that provided by side-view imaging devices. The various imaging device may be cameras, video cameras, or the like capable of capturing an image around the vehicle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the accompanying drawings.

The above and other objects can be accomplished by the provision of a vehicle side and rear monitoring system with a fail-safe function and method thereof. In an exemplary embodiment, a vehicle side and rear monitoring system with a fail-safe function may include first connection units including imaging device controllers connected to side-view imaging devices of a vehicle, the imaging device controllers allowing an image captured by the side-view imaging devices to be displayed on side-view monitors disposed to a side within the vehicle, and a second connection unit including a controller connected to an AVM imaging device, the controller allowing an image captured by the AVM imaging device to be displayed on an AVM monitor located within the vehicle, wherein the controller may be configured to determine whether an abnormality occurs in the first connection units, allow the image captured through the second connection unit to be displayed on the side-view monitors when the abnormality occurs in the first connection units, and allow an image rotation transformation to be performed after distortion of the image captured by the AVM imaging device is corrected when the image is displayed on the side-view monitors through the second connection unit.

The abnormality of the first connection units may include at least one of an abnormality or malfunction of the imaging device controllers, an abnormality or malfunction of the side-view imaging devices, and a communication abnormality or failure of the first connection units. When the distortion of the image captured by the AVM imaging device is corrected and the image rotation transformation is then performed, the image may be vehicle side and rear images captured by the AVM imaging device.

The image provided to the side-view monitors through the second connection unit may be a side image captured by the AVM imaging device. Additionally, the image provided to the side-view monitors through the second connection unit may be an image generated by collecting side and rear images captured by the AVM imaging device (e.g., an image that combines the captured side and rear images). The image output to the side-view monitors through the second connection unit may include a message regarding the abnormality of the first connection units. The first connection units may be disposed at respective left and right sides of the vehicle. The controller may include a video distributor module (VDM), and the VDM may be configured to correct distortion of the image captured by the AVM imaging device and then perform an image rotation transformation.

In another exemplary embodiment, a vehicle side and rear monitoring method with a fail-safe function may include determining whether an abnormality occurs in side-view imaging devices, imaging device controllers, and side-view monitors of a vehicle, and displaying an image captured by an AVM imaging device on the side-view monitors by a controller when the abnormality is determined to occur in the side-view imaging devices, the imaging device controllers, and the side-view monitors of the vehicle, wherein the displaying of an image captured by the AVM imaging device on the side-view monitors by the controller may include correcting distortion of the image captured by the AVM imaging device and then performing an image rotation transformation.

The determining of whether an abnormality occurs in side-view imaging devices, imaging device controllers, and side-view monitors of a vehicle may include determining whether the abnormality or malfunction of the imaging device controllers, the abnormality or malfunction of the side-view imaging devices, and a communication abnormality or failure between the side-view imaging devices, the imaging device controllers and the side-view monitors occur. In correcting distortion of the image captured by the AVM imaging device and then performing an image rotation transformation, the image may be vehicle side and rear images captured by the AVM imaging device.

In the displaying of an image captured by the AVM imaging device on the side-view monitors by the controller, the image may be a side image captured by the AVM imaging device. In addition, the image may be an image generated by collecting side and rear images captured by the AVM imaging device. The displaying of an image captured by the AVM imaging device on the side-view monitors by the controller may further include outputting an image including a warning message. The side-view imaging devices, the imaging device controllers, and the side-view monitors may be disposed at respective left and right sides of the vehicle. The controller may include a VDM, and the VDM may be configured to correct distortion of the image captured by the AVM imaging device and then perform an image rotation transformation.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
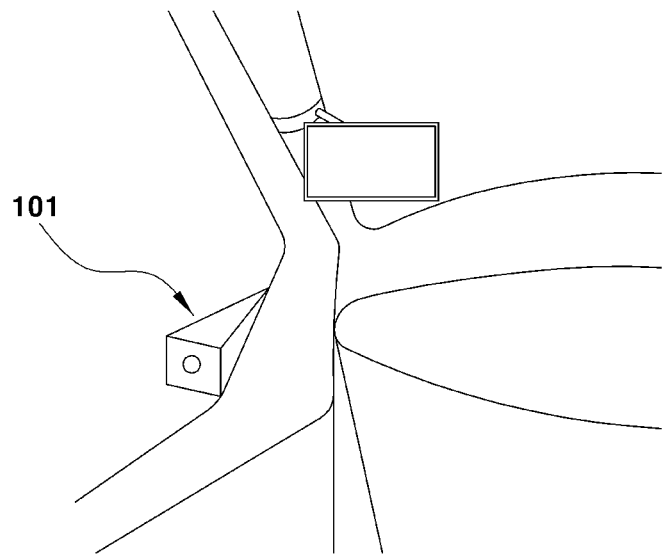
FIG. 1 is a view illustrating a conventional side and rear monitoring system including a mirror part as a fail-safe component thereof according to the related art.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. The terms, such as "part", "unit", "module", etc., used in the specification of the present invention refer to units that process at least one function or operation, and these may be implemented by hardware, software, or a combination thereof.

Furthermore, the terms including expressions, such as first and/or second, used in the specification of the present invention may be used to describe various elements of the present invention. However, the elements of the present invention should not be limited by the terms used in the specification of the present invention. In other words, such terms will be used only to differentiate one element from other elements of the present invention.

Figure 2:
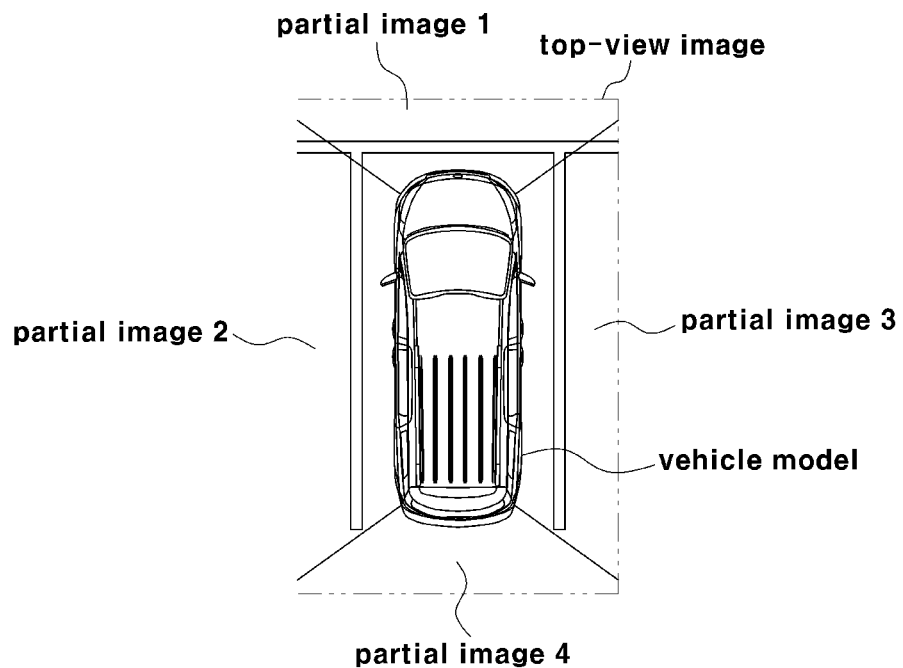
FIG. 2 is a view illustrating an output image area of an AVM imaging device according to an exemplary embodiment of the present invention.

FIG. 2 illustrates the front, rear, left, right fields of view of a vehicle provided by an around view monitoring (AVM) system in the vehicle equipped with the AVM system according to an exemplary embodiment of the present invention. In other words, the AVM system may include at least one AVM imaging device (e.g., a camera, video camera, or the like) 301, and a controller 302 configured to display images captured by the AVM imaging device 301 on an AVM monitor 303. The AVM imaging device 301 may be disposed at the front, rear, left, and right of the vehicle.

The controller 302 configured to operate the AVM system may include a memory configured to collect a plurality of images captured by the AVM imaging device 301. The memory may be configured to store basic data for a unit, control data for operation control of the unit, and input/output data. The memory may be a variety of storage devices such as ROM, RAM, EPROM, flash drive, and hard drive. Additionally, the memory may be configured to store vehicle surrounding images acquired by the AVM imaging device 301 and store AVM images generated in the controller. The memory may also be configured to store a look-up table used to synthesize individual images acquired by the AVM imaging device 301. The look-up table is a table that stores a corresponding relationship between one pixel of the synthetic image and any pixel of the original four images. The AVM imaging device 301 may be installed extraneous to the vehicle to acquire images around the vehicle. Particularly, each camera included in the AVM imaging device may be a super wide-angle camera having an angle of view of 180° or more.

Figure 3:
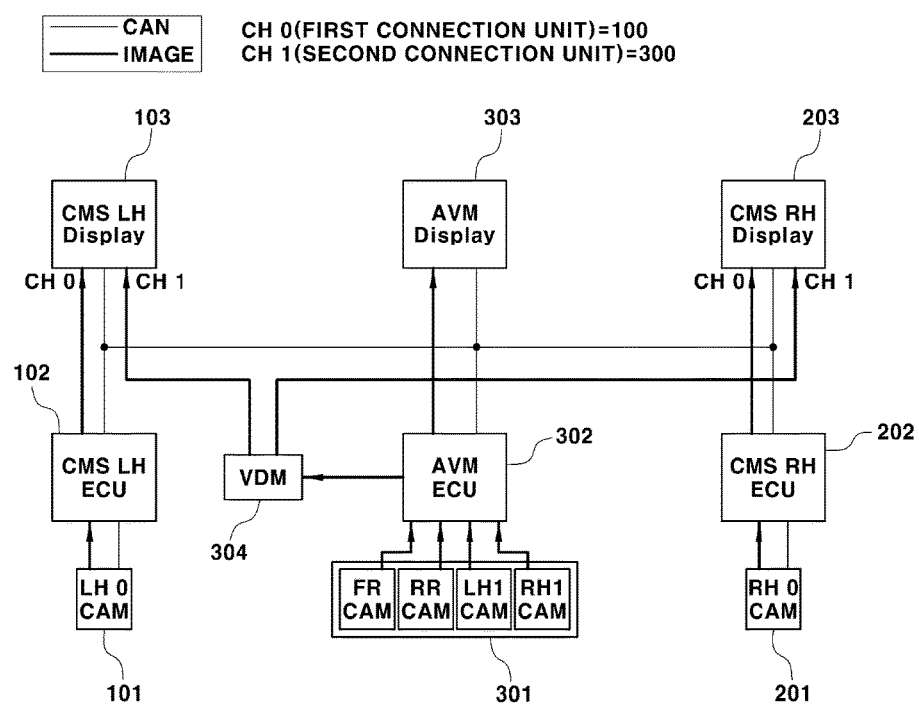
FIG. 3 is a diagram illustrating the connection configuration of a vehicle side and rear monitoring system with a fail-safe function according to the exemplary embodiment of the present invention.

FIG. 3 illustrates the connection configuration of the vehicle side and rear monitoring system with a fail-safe function according to the exemplary embodiment of the present invention. In particular, the side and rear monitoring system may include first connection units 100. The first connection units 100 may each include side-view imaging devices 101 and 201 configured to capture the side images of the vehicle, side-view monitors 103 and 203 disposed at the left and right within the vehicle for displaying the images captured by the side-view imaging devices 101 and 201, and imaging device controllers 102 and 202 configured to control the side-view imaging devices 101 and 201 and the side-view monitors 103 and 203. The first connection units 100 may be disposed at the left and right of the vehicle, respectively.

Accordingly, the side-view imaging devices 101 and 201, the side-view monitors 103 and 203, and the imaging device controllers 102 and 202 may be configured to monitor the outer sides of the vehicle (e.g., the surround exterior of the vehicle), and these components may be configured to communicate with one another via controller area network (CAN) communication. Moreover, the side and rear monitoring system may further include a second connection unit 300 including an AVM system. The AVM system may include at least one AVM imaging device 301, and a controller 302 configured to display images captured by the AVM imaging device 301 on an AVM monitor 303. In the exemplary embodiment of the present invention, the controller may be connected to the side-view monitors 103 and 203 via a video distributor module (VDM) 304 as the component thereof.

The controller 302 of the AVM system may be configured to determine whether abnormalities, failures, or malfunctions occur in the imaging device controllers 102 and 202 and the side-view imaging devices 101 and 201, which are the components of the first connection units 100, and whether an abnormality or failure occurs in the communication of the first connection units 100. When abnormalities are detected in the configuration and connection relationship of the first connection units 100, the image captured by the AVM imaging device 301 of the AVM system may be displayed on the side-view monitors 103 and 203. In addition, when the controller displays the images captured by the side-view cameras of the AVM on the side-view monitors 103 and 203, the VDM 304 may be configured to correct the distortion of the image captured by the AVM imaging device 301 and perform an image rotation transformation.

Further, when the controller displays the image of the AVM imaging device 301 on the side-view monitors 103 and 203, the VDM 304 may be configured to collect the images of the side-view imaging devices of the AVM and AVM rear-view imaging device to correct the distortion of the collected images and perform an image rotation transformation. In other words, the VDM 304 may be configured to combine the images collected by each of the imaging devices to form one single image that provides both side and rear views of the vehicle. As described above, the VDM 304 may be configured to correct a distorted image caused by a difference between images captured by the AVM imaging device 301 and the side-view imaging devices 101 and 201 due to the different attachment positions thereof, and correct an image in which the perspective of a subject is extremely distorted by the AVM imaging device 301 as a wide-angle camera. Accordingly, the controller includes a component which allows the image captured by at least one of the side-view imaging devices of the AVM and the AVM rear-view imaging device to coincide with the image captured by the side-view imaging devices 101 and 201. In other words, the distortion correction aligns the views in the different images to compensate for different mounting positions of the imaging devices on the vehicle. Therefore, the VDM 304 of the controller may be configured to collect the images received from the imaging devices of the AVM imaging device 301.

Figure 4:
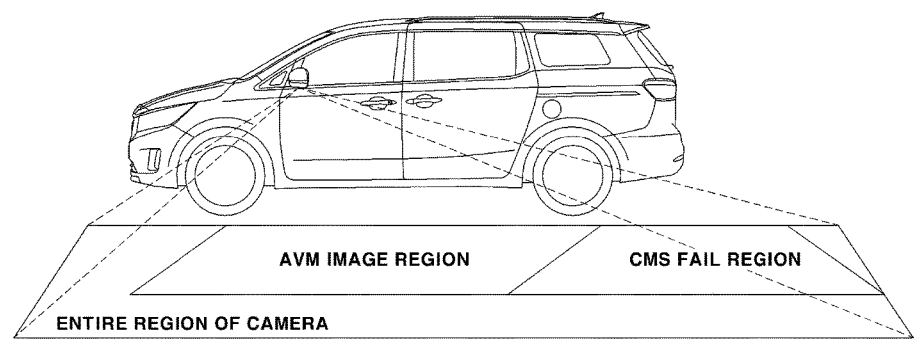
FIG. 4 is a view illustrating that an image in an AVM system is corrected when an abnormality occurs in the vehicle side and rear monitoring system according to the exemplary embodiment of the present invention.

FIG. 4 illustrates a comparison between the side image region on the AVM monitor 303 and the image regions captured by the side-view imaging devices 101 and 201. The side-view imaging devices of the AVM imaging device 301 may be a super wide-angle imaging device having an angle of view of 180° or more, and may be configured to capture a wider region than the image region displayed on the AVM monitor 303. The image region, which may be captured by the AVM imaging device 301, may include the image regions which may be captured by the side-view imaging devices 101 and 201. Therefore, when the abnormalities of the side-view imaging devices 101 and 201 and the imaging device controllers 102 and 202 and the communication abnormality between the side-view imaging devices 101 and 201 and the controller are detected, the partial region of the AVM imaging device 301 may be corrected and displayed on the side-view monitors 103 and 203. In addition, when the image regions of the side-view imaging devices 101 and 201, which deviate from the image region of the side-view imaging devices of the AVM imaging device 301, are present, the image region of the side-view imaging devices of the AVM imaging device 301 and the image region of the rear-view imaging device of the AVM imaging device 301 may be collected and displayed on the side-view monitors 103 and 203.

Figure 5:
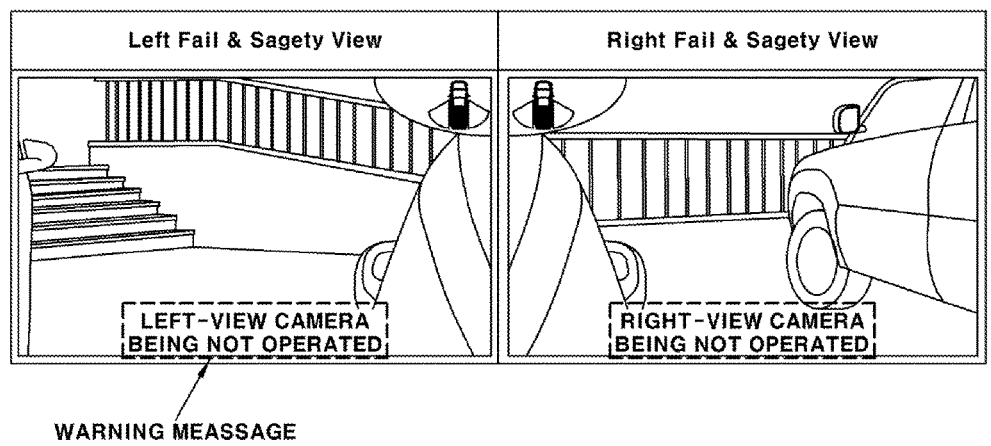
FIG. 5 is a view illustrating that an image is output from the AVM system to a side-view monitor when an abnormality occurs in the vehicle side and rear monitoring system according to the exemplary embodiment of the present invention.

FIG. 5 illustrates that, when an abnormality is detected in the first connection units 100, the image captured by the AVM imaging device 301 is displayed on the side-view monitors 103 and 203. When the image is provided to the side-view monitors 103 and 203 by the controller, the controller may be configured to output the warning messages regarding the abnormalities of the first connection units 100 via the side-view monitors 103 and 203, and output the image together with the warning messages.

In the exemplary embodiment of the present invention, when the abnormalities of the first connection units 100 provided at the left and right are detected by the controller, warning messages including the abnormal positions and configurations of the first connection units 100 may be displayed on the side-view monitors 103 and 203. In other words, as illustrated in the drawing, when the image of the AVM imaging device 301, which is corrected and rotation-transformed, is output to the side-view monitors 103 and 203, waning messages including abnormal positions and configurations may be displayed at a center lower end of each of the side-view monitors 103 and 203.

Figure 6:
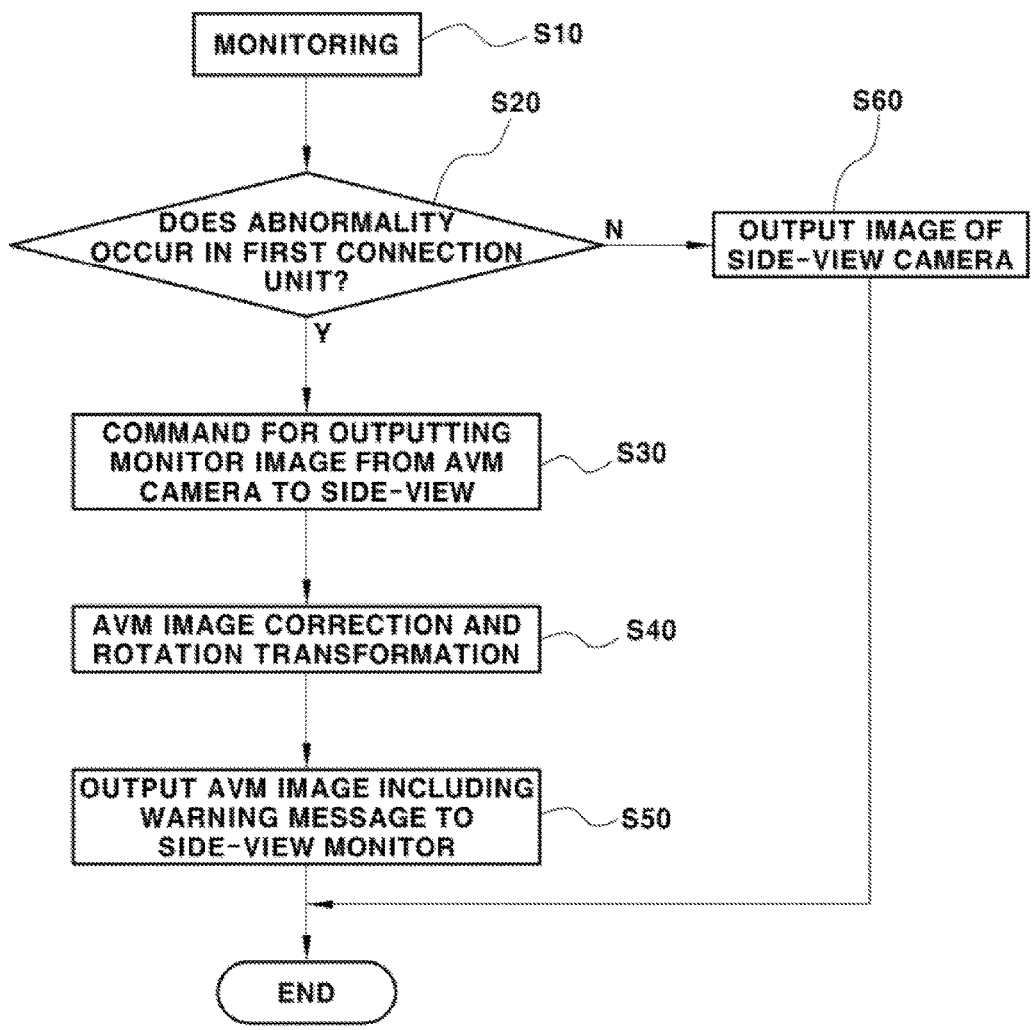
FIG. 6 is a flowchart illustrating a process of performing the fail-safe of the vehicle side and rear monitoring system according to the exemplary embodiment of the present invention.

FIG. 6 is a flowchart illustrating a vehicle side and rear monitoring method with a fail-safe function according to an exemplary embodiment of the present invention. In step S10 of monitoring the side and rear of a vehicle, the controller may be configured to determine whether an abnormality occurs in first connection units 100 (S20). The abnormalities of the first connection units 100 may include at least one of the abnormalities of side-view imaging devices 101 and 201, the abnormalities of imaging device controllers 102 and 202, and the communication abnormality between the first connection units 100.

However, when an abnormality is not detected in the first connection units 100, the images of the side-view imaging devices 101 and 201 may continuously output by the controller (e.g., displayed on monitor) (S60). When at least one of the abnormalities of the side-view imaging devices 101 and 201, the abnormalities of the imaging device controllers 102 and 202, and the communication abnormality between the first connection units 100 is detected by the controller, a command for outputting an image captured by an AVM imaging device 301 to side-view monitors 103 and 203 may be output by the controller (S30). A VDM 304 of the controller may be configured to correct the distortion of the AVM image and perform an image rotation transformation, in response to the command for outputting the image captured by the AVM imaging device 301 to the side-view monitors 103 and 203 (S40).

The AVM image distortion correction and the image rotation transformation may be performed using the image captured by the side-view imaging devices of the AVM imaging device 301, or using the images captured by the side- and rear-view imaging devices of the AVM imaging device 301. When the corrected and transformed image output from the AVM imaging device 301 is displayed on the side-view monitors 103 and 203, the warning messages of the abnormalities of the first connection units 100 may be included in the image and may be output to the center lower end of each of the side-view monitors 103 and 203 (S50). Furthermore, the warning messages may include the abnormal positions and configurations of the first connection units 100.

As is apparent from the above description, the present invention may obtain the following effects by the configuration, combination, and use relationship of components in exemplary embodiments. It may be possible to provide the continuous side field of view of a vehicle through the side-view monitors of the vehicle. In addition, since a continuous side image may be provided using an AVM (Around View Monitoring) system even when an abnormality occurs in sending the image to the side-view monitors through the side-view imaging devices of the vehicle, it may be possible to safely drive a vehicle that does not have side-view mirrors. Furthermore, since an image may be provided without a separate additional side-view mirror even when an abnormality occurs in sending the image to the side-view monitors through the side-view imaging devices, it may be possible to provide a fail-safe monitoring system without additional components.

Although exemplary embodiments have been described with reference to a number of illustrative exemplary embodiments thereof, it should be understood that numerous other modifications and applications may be devised by those skilled in the art that will fall within the intrinsic aspects of the exemplary embodiments. More particularly, various variations and modifications are possible in concrete constituent elements of the exemplary embodiments. In addition, it is to be understood that differences relevant to the variations and modifications fall within the spirit and scope of the present disclosure defined in the appended claims.

What is claimed is:

1. A vehicle side and rear monitoring system with a fail-safe function, comprising:
   first connection units including imaging device controllers connected to side-view imaging devices of a vehicle, the imaging device controllers display a side-view image captured by the side-view imaging devices on side-view monitors disposed at a side within the vehicle; and
   a second connection unit including a controller connected to an around view monitoring (AVM) imaging device, the controller displays an around-view image captured by the AVM imaging device on an AVM monitor located within the vehicle,
   wherein the controller determines whether an abnormality occurs in the first connection units, displays the side-view image captured by the AVM imaging device captured through the second connection unit on the side-view monitors when the abnormality occurs in the first connection units, and performs an image rotation transformation after distortion of the image captured by the AVM imaging device is corrected to be identical with the image captured by the side-view imaging devices when the image is displayed on the side-view monitors through the second connection unit.

2. The vehicle side and rear monitoring system of claim 1, wherein the abnormality of the first connection units includes at least one selected from the group consisting of: an abnormality of the imaging device controllers, an abnormality of the side-view imaging devices, and a communication abnormality of the first connection units.

3. The vehicle side and rear monitoring system of claim 1, wherein, when the distortion of the image captured by the AVM imaging device is corrected and the image rotation transformation is performed, the image is vehicle side and rear images captured by the AVM imaging device.

4. The vehicle side and rear monitoring system of claim 1, wherein the image provided to the side-view monitors through the second connection unit is a side image captured by the AVM imaging device.

5. The vehicle side and rear monitoring system of claim 1, wherein the image provided to the side-view monitors through the second connection unit is an image generated by collecting side and rear images captured by the AVM imaging device.

6. The vehicle side and rear monitoring system of claim 1, wherein an image output to the side-view monitors through the second connection unit includes a message regarding the abnormality of the first connection units.

7. The vehicle side and rear monitoring system of claim 1, wherein the first connection units are disposed at respective left and right sides of the vehicle.

8. The vehicle side and rear monitoring system of claim 1, wherein the controller includes a video distributor module (VDM) that corrects distortion of the image captured by the AVM imaging device and perform an image rotation transformation.

9. A vehicle side and rear monitoring method with a fail-safe function, comprising:
   determining, by a controller, whether an abnormality occurs in side-view imaging devices, imaging device controllers, and side-view monitors of a vehicle; and
   displaying, by the controller, an around view image captured by an around view monitoring (AVM) imaging device on the side-view monitors when the abnormality is detected in the side-view imaging devices, the imaging device controllers, and the side-view monitors of the vehicle,
   wherein the displaying of an image captured by the AVM camera on the side-view monitors includes correcting, by the controller, distortion of the image captured by the AVM imaging device and performing an image rotation transformation to be identical with the image captured by the side-view imaging device.

10. The vehicle side and rear monitoring method of claim 9, wherein the determining of whether an abnormality occurs in side-view imaging devices, imaging device controllers, and side-view monitors of a vehicle includes:
    determining, by the controller, whether the abnormality of the imaging device controllers, the abnormality of the side-view imaging devices, and a communication abnormality between the side-view imaging devices, the imaging device controllers and the side-view monitors occur.

11. The vehicle side and rear monitoring method of claim 9, wherein, in correcting distortion of the image captured by the AVM imaging device and performing an image rotation transformation, the image is vehicle side and rear images captured by the AVM imaging device.

12. The vehicle side and rear monitoring method of claim 9, wherein, in the displaying of an image captured by the AVM imaging device on the side-view monitors, the image is a side image captured by the AVM imaging device.

13. The vehicle side and rear monitoring method of claim 9, wherein, in the displaying of an image captured by an AVM imaging device on the side-view monitors, the image is an image generated by collecting side and rear images captured by the AVM imaging device.

14. The vehicle side and rear monitoring method of claim 9, wherein the displaying of an image captured by an AVM imaging device on the side-view monitors includes outputting, by the controller, an image that includes a warning message.

15. The vehicle side and rear monitoring method of claim 9, wherein the side-view imaging devices, the imaging device controllers, and the side-view monitors are disposed at respective left and right sides of the vehicle.

16. The vehicle side and rear monitoring method of claim 9, wherein the controller includes a video distributor module (VDM) that corrects distortion of the image captured by the AVM imaging device and perform an image rotation transformation.

* * * * *